UNITED STATES PATENT OFFICE.

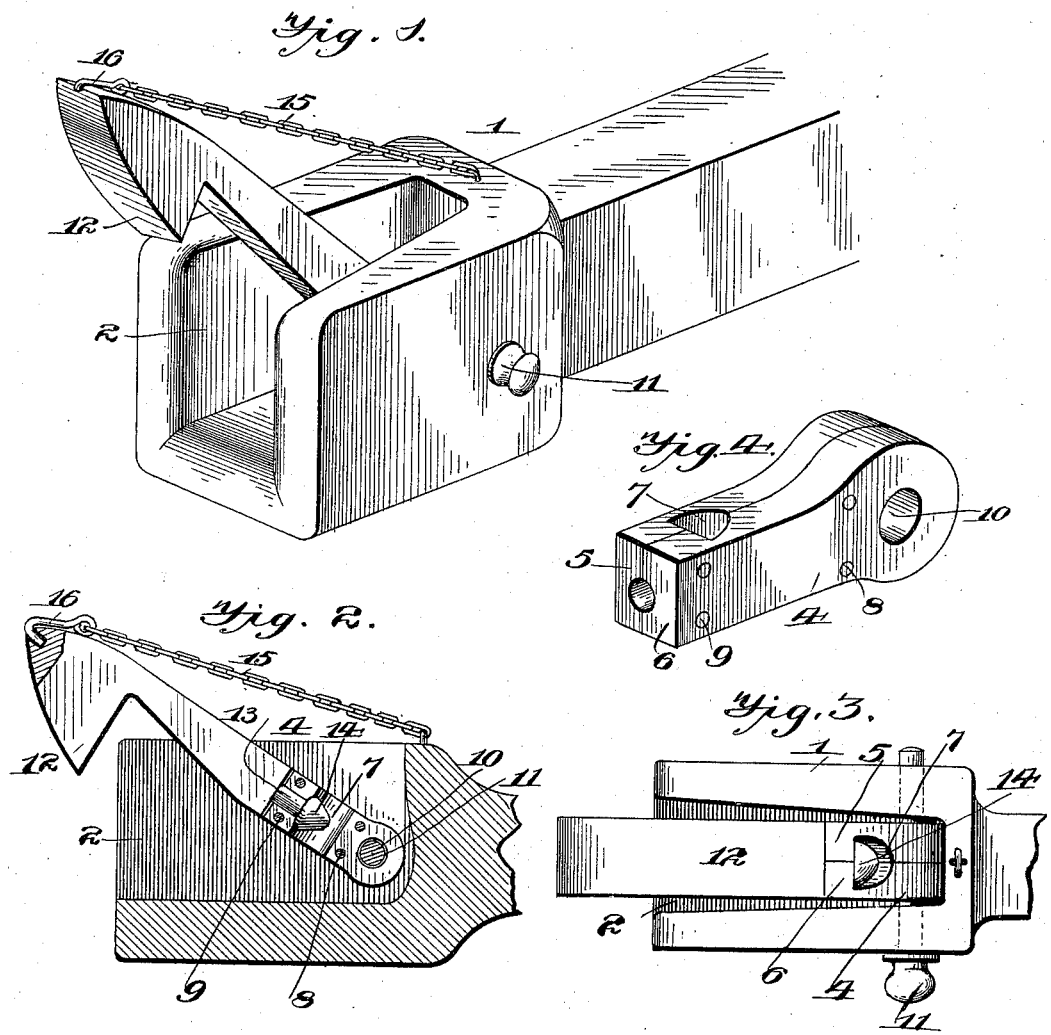

RANSOM M. CHANCE, OF HOOK'S SWITCH, TEXAS.

CAR-COUPLING.

SPECIFICATION forming part of Letters Patent No. 598,768, dated February 8, 1898.

Application filed March 11, 1897. Serial No. 626,922. (No model.)

*To all whom it may concern:*

Be it known that I, RANSOM M. CHANCE, a citizen of the United States, residing at Hook's Switch, in the county of Hardin and State of Texas, have invented certain new and useful Improvements in Car-Couplings; and I do hereby declare the following to be a full, clear, and exact description of the invention, such as will enable others skilled in the art to which it appertains to make and use the same.

My invention relates to car-couplers of the pivoted-hook type.

My object is to provide a car-coupler of extremely simple and cheap construction which will be adapted to automatically couple when in proper arrangement and which can be easily uncoupled and held in inoperative position whenever desirable.

A further object is to provide a car-coupler of the class described which will have a hook of improved construction which will be adapted to turn or twist and for lateral movement, so that any inequality in the road-bed and the relative movements of the draw-heads will be compensated.

Having the foregoing objects in view, the invention consists of a car-coupler of improved construction, as will appear more fully in the following description, and the novel features thereof will be recited in the appended claims.

In the accompanying drawings, Figure 1 is a perspective view of my improved car-coupler; Fig. 2, a longitudinal section; Fig. 3, a plan view; Fig. 4, a detail view of the separable pivoted link, and Fig. 5 a view showing two couplers uncoupled.

The numeral 1 designates the draw-head, which is chambered or hollowed longitudinally from its top downward, as at 2, and it will be observed that as this chamber widens toward the outer end of the draw-head free lateral movement of the coupling-hooks can be had.

The numeral 4 designates a link which is formed in two halves 5 and 6, which are notched or cut away at 7 from top to bottom. The halves are secured together by rear bolts 8 and the forward bolts 9. The link is provided with an opening 10 at its rear end, and 11 designates a pivot-pin which passes through the draw-head and the said opening. It will be observed that this pivot-pin is of smaller size than the opening through which it passes, so that lateral movement can be had.

The numeral 12 designates the coupling-hook, which has a neck 13 projecting from its rear end, which is journaled between the adjacent portions of the link and is provided with a head 14, which lies in the notches of said link. It will be observed, therefore, that there is a swiveled connection between the hook and the link, and hence the hook can turn or twist to any desired extent. The head of the hook projects beyond the mouth of the draw-head and is adapted to enter the mouth of the coupler on the other car. Said head is suitably rounded to insure its riding on the hook of the other coupler before engagement therewith. At 15 there is shown a chain which is secured to the draw-head and is provided with a hook 16 at its free end adapted for reception in an opening in the end of the hook 12. Provision is made thus for holding the coupling devices unlocked and in operative position whenever desirable; but when in position for coupling the hooks rest on the bottoms of the draw-heads. When in position for coupling, the rounded portion on one hook-head is uppermost, and the rounded portion of the other hook-head is undermost, and the shanks of both hooks rest on the bottoms of the draw-heads. The hooks are then adapted to ride on each other and engage when brought together. The swiveled hooks can turn or twist or swing laterally, according to the inequalities of the road-bed and the movements of the couplers; but by reason of the reception of each hook in the draw-head of the other coupler said hooks will not disengage during their movements. The link is formed in separable halves, so that the couplers can be easily manufactured and readily replaced should they become damaged or broken.

There are many changes which could be resorted to in carrying out the present invention without detracting from any of its advantages, and hence it is to be understood that I do not limit myself to the precise construction herein shown and described, but consider that I am entitled to all such changes as properly come within the spirit and scope of the invention.

Having thus described my invention, what I claim as new, and desire to secure by Letters Patent, is—

1. In a car-coupler, the combination with a draw-head, of a coupling-hook pivoted and swiveled thereto.

2. In a car-coupler, the combination with a draw-head, of a link pivoted thereto and a coupling-hook swiveled to the link.

3. In a car-coupler, the combination with a draw-head recessed or chambered longitudinally from its top downwardly, of a link lying in said recess, a movable coupling-pin passed through the link, and a coupling-hook swiveled to the link and which also lies within the recess.

4. In a car-coupler, the combination with a draw-head, of a pivoted link made in separable halves, and a coupling-hook swiveled between and in said halves.

5. In a car-coupler, the combination with a draw-head, of a link pivoted thereto which is made in separable halves having their adjacent faces notched, and a coupling-hook provided with a neck which is journaled between said halves and provided with a head that lies in the notches.

In testimony whereof I have signed this specification in the presence of two subscribing witnesses.

RANSOM M. CHANCE.

Witnesses:
J. L. McELYEA,
W. W. CRUSE.